United States Patent Office 2,758,631
Patented Aug. 14, 1956

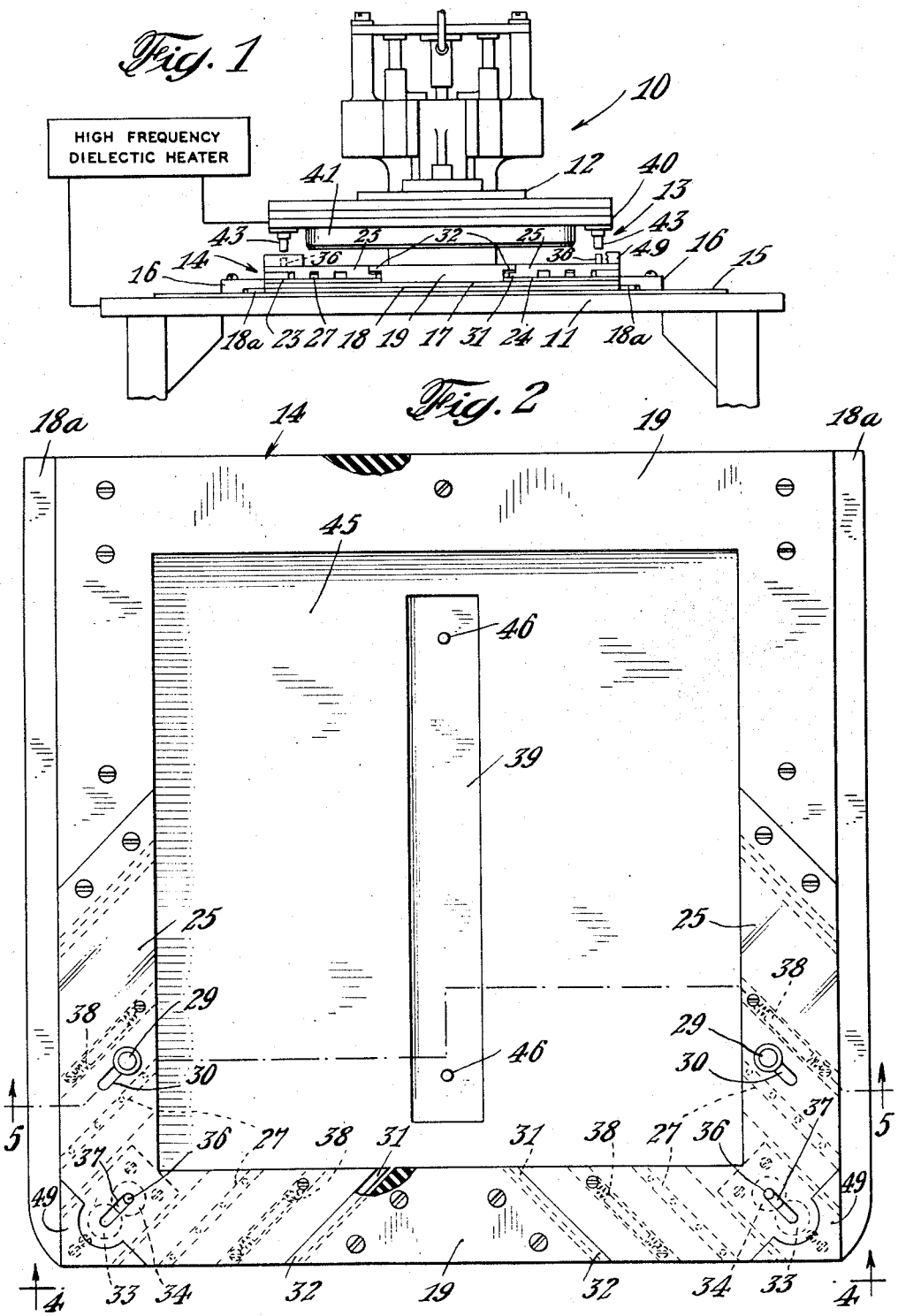

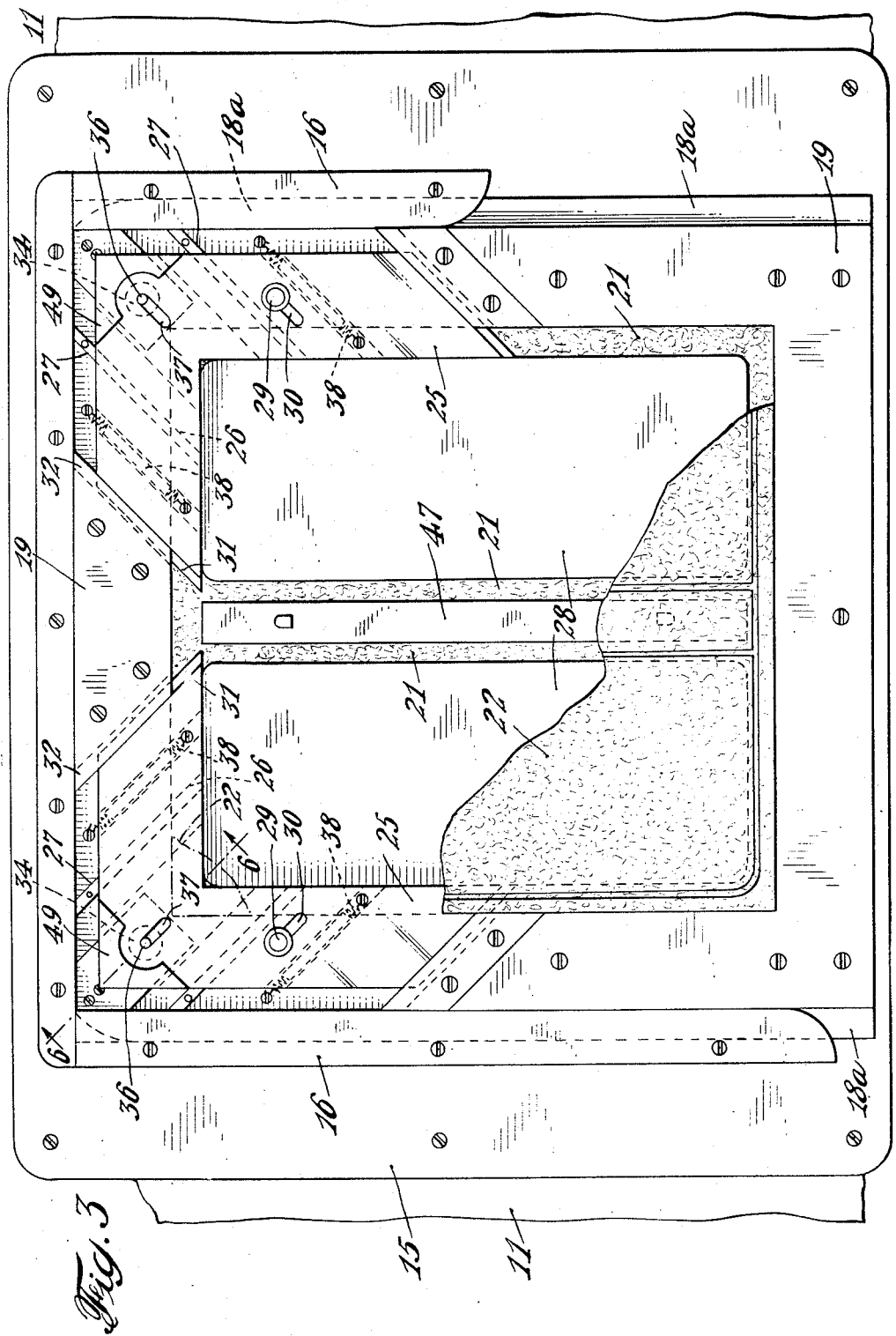

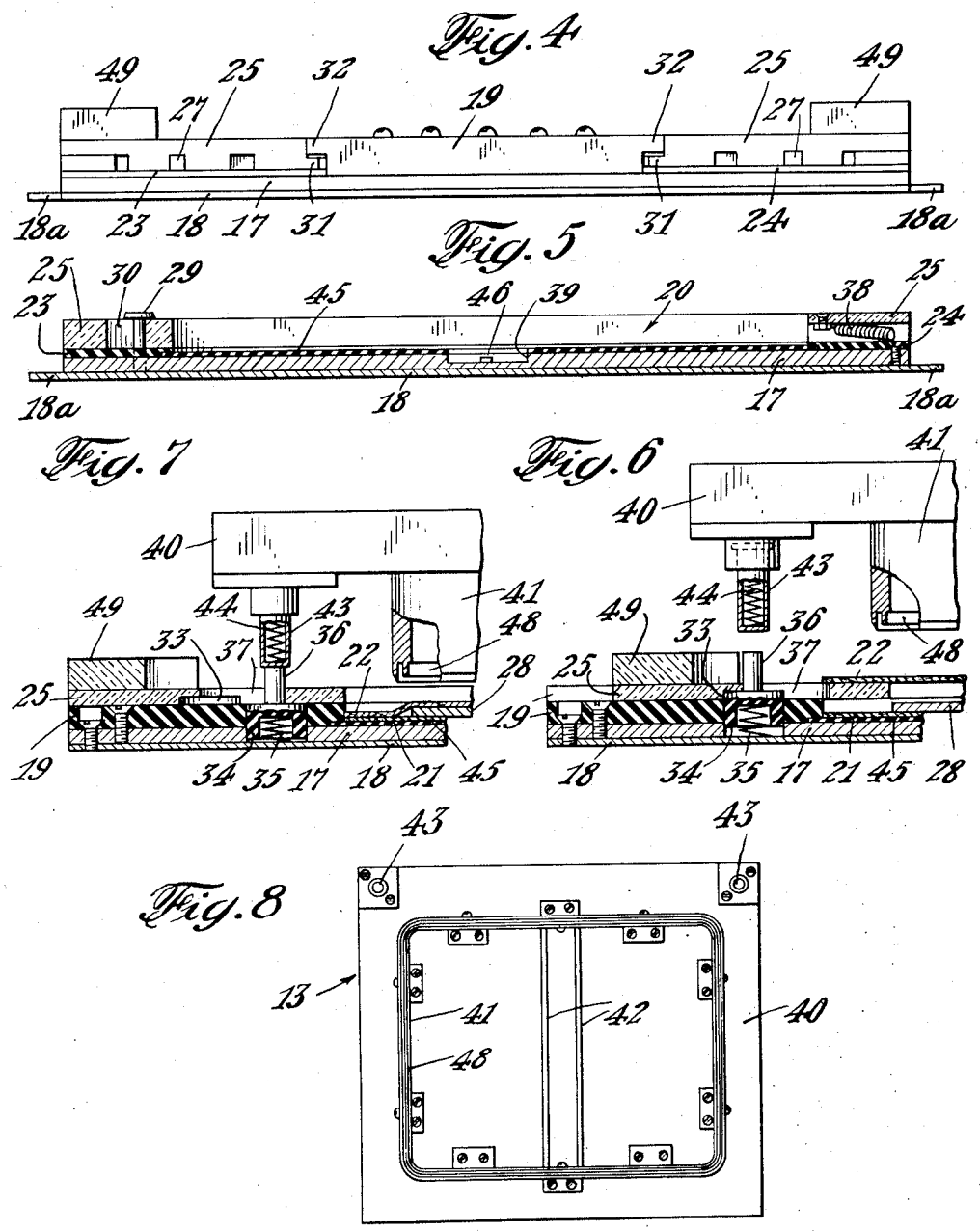

2,758,631

APPARATUS FOR MAKING PLASTIC COVERS

Everett A. Peterson and Harold W. Peterson, Roslyn Heights, N. Y., assignors to A. W. Peterson & Sons Die Co., Inc., New York, N. Y., a corporation of New York Application July 28, 1954, Serial No. 446,254

6 Claims. (Cl. 154—42)

This invention relates to joining thermoplastic sheets and more particularly to apparatus for simultaneously heating and sealing thermoplastic sheets with stiffeners therebetween, the apparatus being especially well suited for making covers or bindings for books as well as other types of articles having surface layers formed of plastic materials.

With the advent of plastic materials, particularly such thermoplastic materials as the vinyls, it had been found advantageous to utilize high frequency dielectric heating apparatus to join two sheets of thermoplastic material by heating and sealing them together about their peripheries with one or more stiffeners therebetween in the manufacture of book bindings or covers of various types and in particular loose leaf ring binders.

One process in connection with which the present apparatus is especially useful involves the heatsealing of a front and back layer of plastic in a press. A die assembly connected to the press head and the press bed may be connected to a high frequency generator so as to form part of a high frequency dielectric heater circuit which functions when the die is brought down to the work to heat the plastic layers to sealing temperature and to apply pressure thereto to seal them together. In practice, two closely spaced side by side seals are formed about the periphery of the work with the outer seal being in effect a deep score line which permits excess material to be torn away leaving a strong, sealed edge. Consequently, the outer seal is generally termed the tear seal. The die may also include one or more embossing surfaces so as to provide a decorative finish to the work.

It has been found that best results are obtained in manufacturing binders as well as other articles when the stiffeners or stays snugly fill the space between the rim sealed plastic sheets. However, it has been extremely difficult and costly to accomplish this. This will be readily appreciated when it is understood that if the die electrodes should at any point come down on the work where a stiffener extends between the plastic sheets the work would be defective and as a consequence wastage of labor as well as work material occurs. To attain the aforementioned close fit extremely close tolerances are necessary between the stiffeners and the electrodes with the result that the stiffeners must be accurately located. It has heretofore been impractical to maintain such close tolerances and as a result a looser fit than that desired was the usual result.

It is, therefore, a principal object of this invention to provide apparatus for sealing juxtaposed plastic sheet layers with stiffeners therebetween which substantially reduces and virtually eliminates the possibility of a misalinement of the various parts of the work while at the same time insuring a rate of production far in excess of that heretofore attained.

Another object is to provide a jig assembly for receiving and alining the work pieces with movable guides maintaining the intermediate stiffeners acurately alined relative to die assembly electrodes until the electrodes are in close proximity and about to engage the work thereby insuring accurate alinement of the work when engaged by the die.

A more specific object is to provide such a jig assembly which is of relatively simple, low cost construction but which nevertheless retains the various parts in accurate correlation so as to virtually eliminate the possibility of misalinement thereof when the work is engaged by the die.

In accordance with the present invention there is provided a work receiving jig assembly which may be readily and accurately positioned on the bed of a press and which includes movable guide members. The guide members may engage one or more of the intermediate work pieces or stiffeners and serve accurately and quickly to position and retain them relative to plastic sheet layers, one above and one below the stiffeners, until just before the die assembly connected to the press head engages the work. Means actuated by the die assembly are provided for automatically retracting the guide members out from between the work and the die when the die arrives into close proximity with the work thereby eliminating the possibility of misalinement of the parts of the work relative one another and the die assembly electrodes.

Further objects, as well as advantages, of this invention will be apparent from the following description thereof and the drawings in which Figure 1 is a front elevational view of a press equipped with die and jig assemblies constructed in accordance with the present invention;

Figure 2 is a plan view of the jig for holding the work;

Figure 3 is a similar view showing one arrangement of work pieces in the jig with the latter in position in its guide on the bed of the press;

Figure 4 is a front elevational view of the jig looking in the direction of line 4—4 of Figure 2;

Figure 5 is a cross sectional view through the line 5—5 of Figure 2;

Figure 6 is a fragmentary sectional view through the line 6—6 of Figure 3 on an enlarged scale with a portion of the die shown approaching the jig assembly and a guide member shifted to its inward position;

Figure 7 is a view similar to Figure 6 with the die assembly shown still closer to the work and after having released the guide member which is shown retracted; and Figure 8 is a plan view of the die assembly.

Referring now to the drawings in detail, press 10 may be a conventional air pressure operated press having the usual bed 11 and movable head 12. Die assembly 13 is insulatedly connected to and mounted on head 12 and is movable therewith toward and away from the work positioned on bed 11. Jig assembly 14 is provided to position the work accurately in relation to the die assembly 13 and is located on bed 11 by means of a locating plate 15 having a C-shaped stop 16 mounted thereon.

As indicated in Figure 1, die assembly 13 and bed 11 are connected to a high frequency electric current generator, shown diagrammatically, so as to form part of a high frequency dielectric heating network. As is well known, work pieces which consist of sheets of thermoplastic material such as suitable vinyls become heated when die assembly 13 comes into sufficiently close proximity with bed 11 with the electrically nonconductive work forming part of the dielectric therebetween.

Jig assembly 14 for retaining the several work pieces in proper alinement comprises a base provided with side rails which when slid into the spaced parallel guideways formed by C-shaped stop 16, serve to securely and accurately position the jig assembly. In the present instance, the base is formed by two sheet metal members 17, 18 with base member 18 extending outwardly of the side of member 17 to provide rail or guide portions 18a which serve to position the jig assembly on bed 11 as indicated. Base members 17, 18 are preferably formed of electrically conductive materials, in the present instance aluminum, and when mounted on the press become directly electrically connected in the electrical circuit as indicated in Figure 1. An insulative frame member 19 conforms substantially to the outline of base member 17 and extends along the peripheral portion thereof as shown, to form a well 20, the outline of which generally may conform to but is somewhat larger than the finished product. The inner walls of frame 19 forming well 20 are adapted to accurately position thermoplastic sheets or layers 21, 22 which respectively form the lining and cover of the finished product. Two adjacent corner portions of frame member 19 are each recessed leaving reduced L-shaped wall portions 23, 24, each of which extends about the respective corner of frame member 19.

It may be well to point out here that while the present invention will be described in connection with the manufacture of one particular type of binder, i. e., a loose leaf ring binder, for which it is especially well suited, it should be understood that the invention may also be used for the manufacture of other types of binders and covers as well as for a wide variety of other types of articles which may be manufactured of thermoplastic sheet material where it is desired to position an intermediate member in the space between opposed sheets of material sealed together about their periphery or that of the intermediate member.

The upper surface of base member 17 is covered with a sheet 45 of insulative material which preferably does not soften at the sealing temperature and which forms the bottom of well 20 and extends sufficiently far under the inwardly presented portion of frame member 19 to avoid the possibility of arc over between portions of die assembly 13 and base member 17 around the edges of sheet 45. The recessed portions 23, 24 of frame member 19 are somewhat thicker than sheet 45 so that the portion of well 20 defined thereby is deep enough to receive layer 21 of the work. A pair of electrically non-conductive movable guide members 25 are each L-shaped and slideably mounted on the upwardly presented surface of one of the reduced portions 23, 24. As shown perhaps most clearly in Figures 2 and 5 guide members 25 when retracted have their inwardly presented surfaces in alinement with those of frame member 19. The under surface of the legs of the guide members 25 have obliquely extending guideways 26 formed therein to receive guide rails 27 extending upwardly from the upper surface of frame member portions 23, 24 with the guideways 26 and rails 27 adjacent one corner for a given guide member extending parallel one with the other. In the present instance guideways 26 and rails 27 also extend parallel with a line bisecting the 90° angle formed in the corner of the respective guide members 25 so that when guide members 25 are moved to their inward position (Figure 3) each of the legs thereof travel the same distance. Furthermore, the travel of guide members 25 is of such a predetermined distance that stays or stiffeners 28 are accurately located thereby just inside the electrodes of die assembly 13 as will be more fully pointed out.

Slideable guide members 25 are each retained on their respective frame member portions 23, 24 by keepers 29 which extend through elongated slots 30 formed in guide members 25 and are secured to the respective underlying frame member portions 23, 24. Enlarged portions of keepers 29 serve as retainers while the end walls of slots 30 together with keepers 29 serve to limit the inward and outward movement of guide members 25. There may also be provided complementary tongues 31, 32 which are formed respectively along the tapered extremities of guide members 25 and the adjacent walls of frame members 19.

The under surface of each guide member 25 has an annular recess 33 formed therein so located that when the guide member reaches the limit of its inward travel the upwardly presented end of plunger 34 is then alined therewith and is free to enter the same to latch its guide member 25 in its inward position. Plungers 34 are each biased by a spring 35 which bears against base member 18 (Figures 6 and 7). A pin 36 is connected to each of each plungers 34 and extends upwardly through a slot 37 formed in each of the guide members 25 and communicating with the respective recesses 33.

Resilient means are provided for retracting each of the movable guide members 25 when plungers 34 are depressed to release the same and include a pair of springs 38 for each of the legs of guide members 25, springs 38 extending parallel to the direction of movement of the guide members. Springs 38 are each secured at opposite ends between respective reduced frame member portions 23, 24 and the guide member legs, slots in the latter being provided in the present instance. Thus, when guide members 25 are moved inward and locked by plungers 34, springs 38 are tensioned and serve to retract the guide members rapidly when plungers 34 are depressed. To facilitate manual movement of L-shaped guide members 25 finger pieces 49 are secured at the apices of each as shown.

A centrally located recess 39 is formed in base member 17 in registration with an aperture provided in sheet 45 so as to communicate with well 20. Locater lugs 46 are connected to base member 17 and extend up into recess 39. Lugs 46 are spaced so as to register with and extend through openings provided therefore in the lining forming layer 21 when the latter is inserted in jig assembly 14. Recess 39 is relatively shallow and is just deep enough to receive the thickness of layer 21 and back member 47, the latter having spaced apertures to receive lugs 46.

Die assembly 13 comprises an electrically conductive support member 40 from which there depends an electrode arrangement suitable for forming the loose leaf ring binder and includes perimeter electrode 41 and a pair of parallel inner electrodes 42 commonly termed back bone electrodes. In each of two adjacent corners of die assembly 13 corresponding to the corners of jig assembly 14 where movable guide members 25 are mounted, there is mounted a plunger 43 with each plunger 43 registering with one of the pins 36. Plungers 43 are each biased by a spring 44 which requires substantially greater force to compress the same than that required to compress springs 35. Normally plungers 43 extend in advance of electrodes 41, 42 a distance sufficiently great to insure that when pins 36 and plungers 34 are depressed thereby to release movable guides 25 there is sufficient time for the guides to be retracted by springs 38 to their outer position and out of the path of the descending electrodes.

For making a loose leaf ring binder the first or lining forming layer 21, precut to seat in the bottom of well 20 and punched to permit the passage therethrough of locater lugs 46, is inserted in the jig assembly. Then back member or bone 47 is inserted over layer 21 and into recess 39 formed in base member 17 and seated on locater lugs 46. Guide members 25 are then moved to and latched by plungers 34 in their inner positions thus forming right angle guides against which stays 28 may readily be accurately positioned in close relation to the line along which electrodes 41, 42 engage the work. The outer cover forming layer is then placed in well 20 with a part thereof lying over guide members 25 which are now latched inwardly so as to extend into the well. The foregoing may readily be accomplished in some convenient work area adjacent press 10 and jig assembly 14 with the work pieces positioned thereon may be slid home on the bed of the press against C-shaped stop 16 thereby accurately positioning the work relative to die assembly 13 which may now be brought down by the press head. The apparatus in addition to causing electronic heating of the thermoplastic layers 21, 22, also applies pressure thereto to seal them one to the other closely adjacent the periphery of stays 28. Very close tolerances between the periphery of stays 28 and interior sealing wall 48 of perimeter electrode 41 are made possible by reason of the accurate positioning of the stays in the jig assembly and which positioning is maintained because guides 25 remain in contact therewith until just before die assembly 13 completes its downward movement. It will be observed (Figure 3) that when jig assembly 14 is thrust into C-shaped stop 16 stays or intermediate members 28 are not disturbed as a result of their inertia since the jig assembly is inserted in stop 16 with guide members 25 leading.

As the electrodes approach close to guides 25 plungers 43 engage and depress pins 36 to release plungers 34 from engagement with the guides thereby permitting them to be urged outward. As shown in Figure 7, when plungers 34 are stopped by base member 18 further downward movement of die assembly 13 to bring the electrodes into engagement with layer 22 results in compression of stiff springs 44. As indicated both pins 36 and plungers 34 are of insulative material so that a short circuit does not occur as a result of their contact with die assembly plungers 43.

After the sealing operation the press head is again raised and jig assembly 14 may be removed from the press to make way for another. The work is removed from the jig assembly and the excess material stripped therefrom along the tear seal as previously indicated. Finally the ring hardware (not shown) is attached in a suitable well known manner.

The terms and expressions which we have employed are used as terms of description and not limitation, and we have no intention, in the use of such terms and expressions, of excluding any equivalents of the features shown and described or portions thereof, but recognize that various modifications are possible within the scope of the invention claimed.

What is claimed is:

1. In an apparatus for making multilayer plastic covers by alining stacked work pieces including two opposed thermoplastic sheets having opposed portions extending beyond an intermediate member for being subjected to high frequency electrical energy as well as pressure closely adjacent the periphery of said intermediate member, the combination of a jig adapted to be mounted on a press bed in operative relation with a movable press head and jig adapted to be connected to one side of a source of said high frequency electrical energy, said jig comprising a first alining means and a second alining means, said first alining means including a nonconductive frame member for receiving and alining said thermoplastic sheets, said second alining means being movable relative to said frame member a predetermined distance to a position for overlying a portion of a first one of said sheets and for defining the position of said intermediate member on said one sheet, releasable locking means on said jig for holding said second alining means in said position, means for moving said second movable means out of said position on release of said locking means, whereby the second one of said sheets may be placed over said intermediate member and said second alining means while the intermediate member is engaged by said second alining means, and means for releasing said locking means when said press head is moved towards it, said releasing means being connected to said press head, said head forming the other side of the connection to said source of electrical energy.

2. In an apparatus for making multilayer plastic covers by alining stacked work pieces including two opposed thermoplastic sheets having opposed portions extending beyond an intermediate member for being subjected to high frequency electrical energy as well as pressure closely adjacent the periphery of said intermediate member, the combination of a jig adapted to be mounted on a press bed in operative relation with a movable press head, said jig being connected to one side of a source of said high frequency electrical energy, said jig comprising a first alining means and a second alining means, said first alining means including a nonconductive frame member for receiving and alining said thermoplastic sheets, said second alining means being movable relative to said frame member a predetermined distance to a position for overlying a portion of one of said sheets and for defining the position of said intermediate member on said one sheet, releasable locking means on said jig for holding said second alining means in said position, and means for moving said second movable means out of said position on release of said locking means, whereby the other of said sheets may be placed over said intermediate member and said second alining means while the intermediate member is engaged by said second alining means, electrode means adapted to be mechanically connected to said press head for movement along a predetermined path and to be electrically connected to the other side of said source, and said electrode means including means for engaging and releasing said locking means as said electrode means comes into close proximity with said second alining means when the press head is moved towards the press bed, whereby said second alining means is removed from the path of said electrode means just before it engages said thermoplastic sheets.

3. In an apparatus for making multilayer plastic covers by alining stacked work pieces including two opposed thermoplastic sheets having opposed portions extending beyond an intermediate member for being subjected to high frequency electrical energy as well as pressure closely adjacent the periphery of said intermediate member, the combination comprising a jig having a conductive base member adapted to be mounted on a press bed in operative relation with a movable press head and for being connected to one side of a source of said high frequency electrical energy, an insulative frame member on said base member and defining therewith a well for receiving and alining said thermoplastic sheets, a pair of spaced nonconductive guide members movably mounted in spaced relation on said frame member and each movable a predetermined distance to a position for overlying a portion of one of said sheets for positioning said intermedite member thereon, locking means on said jig for engaging and securing said guide members in said position and including a nonconductive releasing member, resilient means on said jig for urging said guide members out of their said positions, a die assembly including a support member adapted to be mounted on said press head, at least one electrode connected to said support member movable therewith along a predetermined path and adapted to be connected to the other side of said source for sealing and bonding said sheets closely about said intermediate member, and means connected to said support member for engaging and actuating said releasing member when said die assembly is moved into close proximity to said guide members, whereby said guide members are automatically retracted from the path of said electrode.

4. In an apparatus for making multilayer plastic covers by alining stacked work pieces including two opposed thermoplastic sheets having opposed portions extending beyond an intermediate member and subjected to high frequency electrical energy as well as pressure closely adjacent the periphery of said intermediate member, the combination comprising a jig having a conductive base member adapted for mounting on a press bed in operative relation with a movable press head and for being connected to one side of a source of said high frequency electrical energy, an insulative frame member connected to and extending around said base member and having an inwardly presented surface defining a well for receiving and alining said thermoplastic sheets, a pair of spaced nonconductive L-shaped guide members for locating said intermediate member between said thermoplastic sheets, said guide members each being movably mounted on said frame member and movable a predetermined distance from an outer first position for insertion of one of said thermoplastic sheets to an inner second position with portions thereof projecting inwardly beyond said frame member and spaced from said base member to overlie said one sheet, said guide members being adapted when in said second position to define the position of said intermediate member in said well, each of said guide members having a plurality of parallel slots formed in the surface of the legs thereof presented toward said frame member, a plurality of rails on said frame member and extending in certain ones of said slots, resilient means extending in other of said slots and for urging said guide members from said second position to said first position, releasable locking means on said base member for securing each of said guide members in its second position, a die assembly including a support member adapted for mounting on said movable press head, at least one electrode connected to said support member being movable therewith along a predetermined path and adapted to be connected to said source and for sealing the other of said thermoplastic sheets overlying said intermediate member to said one sheet, and means connected to said support member for releasing said locking means as said die assembly is brought into proximity to said jig assembly, whereby said guide members are automatically retracted by said resilient means from said well and the path of said electrode.

5. Apparatus for making multilayer plastic covers by alining stacked work pieces including two opposed thermoplastic sheets having opposed portions extending beyond an intermediate member for being subjected to high frequency electrical energy as well as pressure closely adjacent the periphery of said intermediate member, comprising a conductive base member adapted to be mounted on a press bed in operative relation with a press head and for being connected to one side of a source of said high frequency electrical energy, an insulative substantially rectangular frame member on said base member and defining therewith a well for receiving and alining said thermoplastic sheets, a pair of spaced L-shaped nonconductive guide members movably mounted on and oppositely disposed at adjacent corners of said frame member, said guide members each being movable a predetermined distance to a position overlying a portion of one of said sheets for defining the postion of said intermediate member on said one sheet, said guide members each having an elongated slot formed therethrough with a portion thereof forming a recess, a movable plunger for each of said guide mmebers and mounted on said base member for registration with and engagement in said recess when the guide members are each in their said positions, a nonconductive releasing member connected to each of said plungers and extending through the corresponding one of said slots, each of said guide members having at least one elongated guideway formed in the surface thereof presented toward said frame member, elongated rails on said frame member for each of said guideways and extending therein, resilient means engaging said plungers and urging the same toward said guide mmebers for engagement in said recesses, and means for moving said guide members out of said positions when said releasing members are actuated to remove said plungers from engagement in said recesses.

6. Apparatus for making multilayer plastic covers by alining stacked work pieces including two opposed thermoplastic sheets having opposed portions extending beyond an intermediate member for being subjected to high frequency electrical energy as well as pressure closely adjacent the periphery of said intermediate member, comprising a conductive base member adapted to be mounted on a press bed in operative relation with a press head and for being connected to one side of a source of said high frequency electrical energy, an insulative substantially rectangular frame member on said base member and defining therewith a well for receiving and alining said thermoplastic sheets, said frame member having at least two L-shaped, reduced portions formed at adjacent corners thereof, a pair of spaced L-shaped nonconductive guide members movably mounted on and oppositely disposed at said adjacent corners of said frame member, said guide members each being movable a predetermined distance to a position overlying a portion of one of said sheets for defining the position of said intermediate member on said one sheet, said guide members each having an elongated slot formed therethorugh with a portion thereof forming a recess, a movable plunger for each of said guide members and mounted on said base member for registration with and engagement in the corresponding one of said recesses when the guide members are each in their said positions, a nonconductive releasing member connected to each of said plungers and extending through the corresponding one of said slots, means movably securing said guide members to said L-shaped portions of said frame member and including at least one elongated guideway formed in the surface of each of said guide members presented toward said frame member, elongated rails on said frame member for each of said guideways and extending therein, resilient means engaging said plungers and urging the same toward said guide members for engagement in said recesses, and other resilient means engaging each of said guide members and said frame member for moving said guide members out of said positions when said releasing members are actuated to remove said plungers from engagement in said recesses.

References Cited in the file of this patent
UNITED STATES PATENTS

| | | |
|---|---|---|
| 2,556,787 | Bach et al. | June 12, 1951 |
| 2,631,646 | Gannon et al. | Mar. 17, 1953 |
| 2,640,401 | Comstock | June 2, 1953 |
| 2,681,296 | Dobbs et al. | June 16, 1954 |